(12) United States Patent
Abrahams et al.

(10) Patent No.: US 10,417,307 B1
(45) Date of Patent: Sep. 17, 2019

(54) COGNITIVE ORIENTED DISPLAY

(71) Applicant: INTERNATIONAL BUSINESS MACHINES CORPORATION, Armonk, NY (US)

(72) Inventors: Faried Abrahams, Laytonsville, MD (US); Krishnan Ramachandran, Campbell, CA (US); Gandhi Sivakumar, Bentleigh (AU); Kushal Patel, Pune (IN); Sarvesh Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/953,867

(22) Filed: Apr. 16, 2018

(51) Int. Cl.
  *G06F 17/21* (2006.01)
  *G06F 16/23* (2019.01)
  *G06Q 30/02* (2012.01)

(52) U.S. Cl.
  CPC ........ *G06F 17/211* (2013.01); *G06F 16/2365* (2019.01); *G06Q 30/0248* (2013.01)

(58) Field of Classification Search
  CPC ...................................................... G06F 17/00
  See application file for complete search history.

(56) References Cited

U.S. PATENT DOCUMENTS

| | | | |
|---|---|---|---|
| 5,832,494 A | 11/1998 | Egger et al. | |
| 5,930,783 A | 7/1999 | Li et al. | |
| 7,165,119 B2 | 1/2007 | Fish | |
| 7,836,391 B2 | 11/2010 | Tong | |
| 8,225,190 B1 * | 7/2012 | Bharat et al. | G06F 17/00 |
| 9,361,001 B2 | 6/2016 | Blasko | |
| 2007/0204288 A1 | 8/2007 | Candelore | |
| 2008/0004953 A1 | 1/2008 | Ma et al. | |
| 2008/0005075 A1 | 1/2008 | Horvitz et al. | |
| 2008/0046218 A1 | 2/2008 | Doutcheva et al. | |
| 2008/0098297 A1 * | 4/2008 | Sun et al. | G06F 17/00 |
| 2009/0164888 A1 | 6/2009 | Phan | |
| 2017/0169128 A1 * | 6/2017 | Batchu Krishnaiahsetty et al. | G06F 17/30 |

OTHER PUBLICATIONS

Peter Mell et al, The NIST Definition of Cloud Computing, National Institute of Standards and Technology, Publication 800-145, 2011, entire document.
Avin Pattath et al, Interactive Visualization and Analysis of Network and Sensor Data on Mobile Devices, IEEE Symposium on Visual Analytics Science and Technology, 2006, pp. 83-90.
Pardis Pourghomi et al, Right-click Authenticate Adoption: The Impact of Authenticating Social Media Postings on Information Quality, IEEE, 2017, pp. 327-331.

(Continued)

*Primary Examiner* — James J Debrow
(74) *Attorney, Agent, or Firm* — Patrick J. Daugherty; Daugherty & Del Zoppo Co., LPA

(57) ABSTRACT

Aspects cognitively displaying media wherein processors are configured to determine an age of a media item as a function of a publication date of the media item, determine a validity value of the media item as a function of content of the media item and the determined age, and display the media item to a viewer in an appearance format that is selected to convey the determined validity value of the content of the media item to the viewer in a manner that is appropriate to the determined age of the media item.

20 Claims, 4 Drawing Sheets

(56) References Cited

OTHER PUBLICATIONS

Watson, Text to Speech, https://www.ibm.com/watson/services/text-to-speech, 2018, pp. 1-7.
Watson, Speech to Text, https://www.ibm.com/watson/services/speech-to-text, 2018, pp. 1-8.

* cited by examiner

COGNITIVE ORIENTED DISPLAY

BACKGROUND

Cognitive models simulate human problem solving and mental task processes in a computerized model. Such models are aimed to remember the past, interact with humans, continuously learn, and refine the responses for future use. A cognitive assistant is a software agent that augments human intelligence by offering capabilities that are beyond the ordinary power and reach of humans. Cognitive assistants offer computational capabilities based on reasoning chains of large amounts of data, which provide cognition powers that augment and scale human intelligence. A cognitive assistant can also interact with humans in a more natural way. Smart search technologies offer solutions to list or sort the search results based on date, but this is an inefficient way in which user needs to look into the details and figure out the age and validity of the news or an advertisement. Also, smart search technologies lack the interactive communication.

SUMMARY

In one aspect of the present invention, a computerized method for cognitively displaying media includes executing steps on a computer processor. Thus, a computer processor is configured to determine an age of a media item as a function of a publication date of the media item, determine a validity value of the media item as a function of content of the media item and the determined age, and display the media item to a viewer in an appearance format that is selected to convey the determined validity value of the content of the media item to the viewer in a manner that is appropriate to the determined age of the media item.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to determine an age of a media item as a function of a publication date of the media item, determine a validity value of the media item as a function of content of the media item and the determined age, and display the media item to a viewer in an appearance format that is selected to convey the determined validity value of the content of the media item to the viewer in a manner that is appropriate to the determined age of the media item.

In another aspect, a computer program product for cognitively displaying media includes executing steps on a computer processor that has a computer-readable storage medium with computer readable program code embodied therewith. The computer readable hardware medium is not a transitory signal per se. The computer readable program code includes instructions for execution which cause the processor to determine an age of a media item as a function of a publication date of the media item, determine a validity value of the media item as a function of content of the media item and the determined age, and display the media item to a viewer in an appearance format that is selected to convey the determined validity value of the content of the media item to the viewer in a manner that is appropriate to the determined age of the media item.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
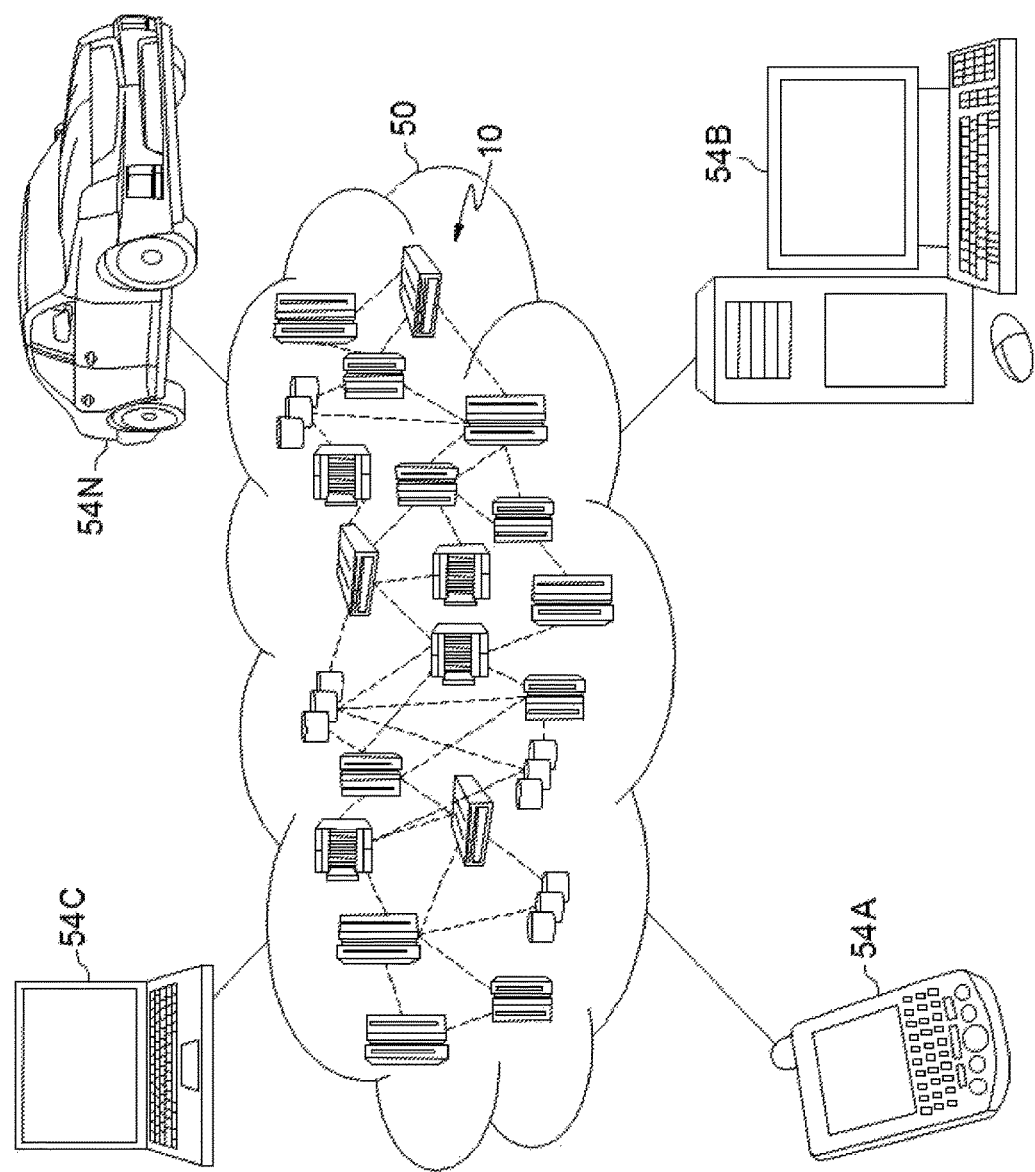
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
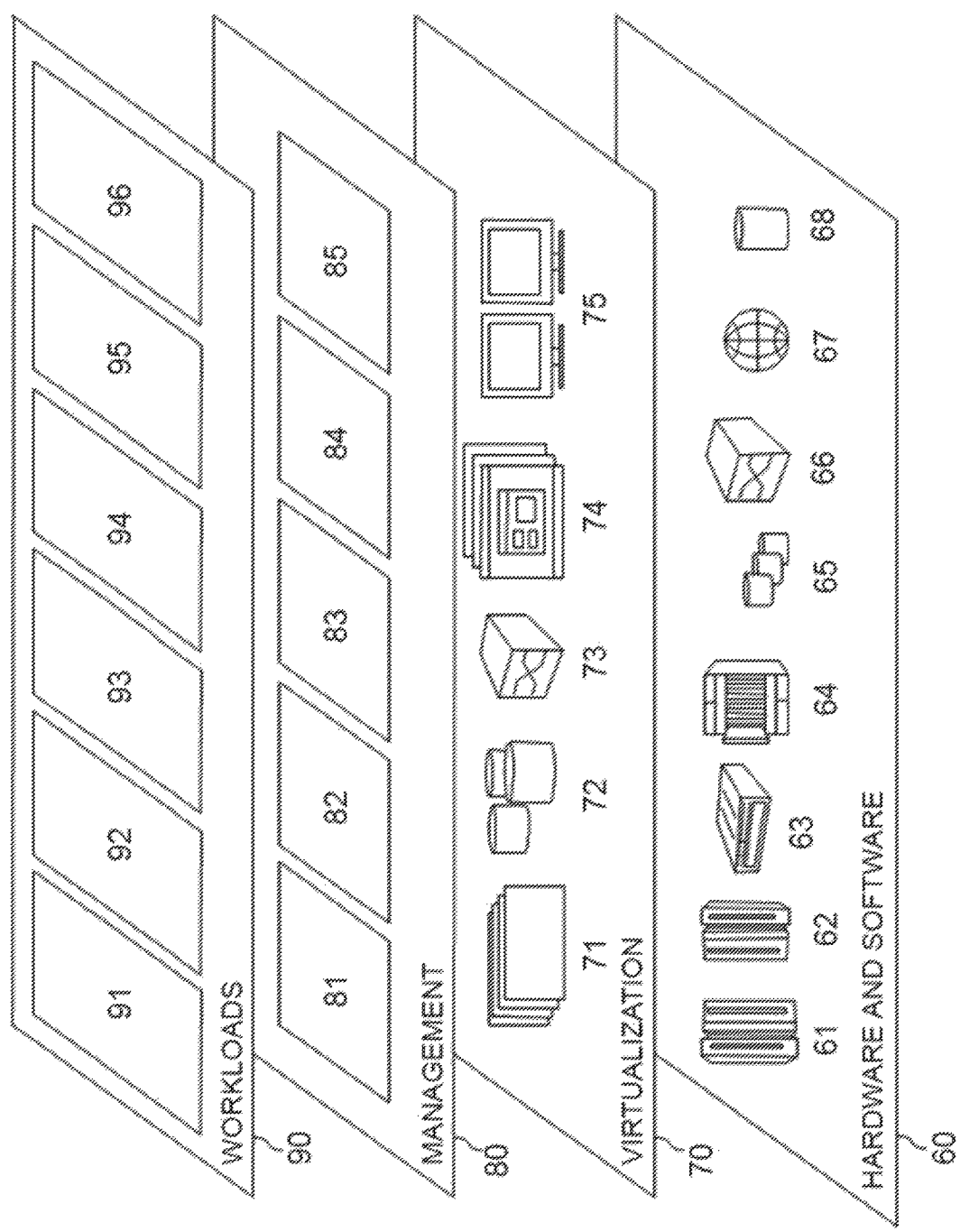
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for cognitively displaying media 96.

Figure 3:
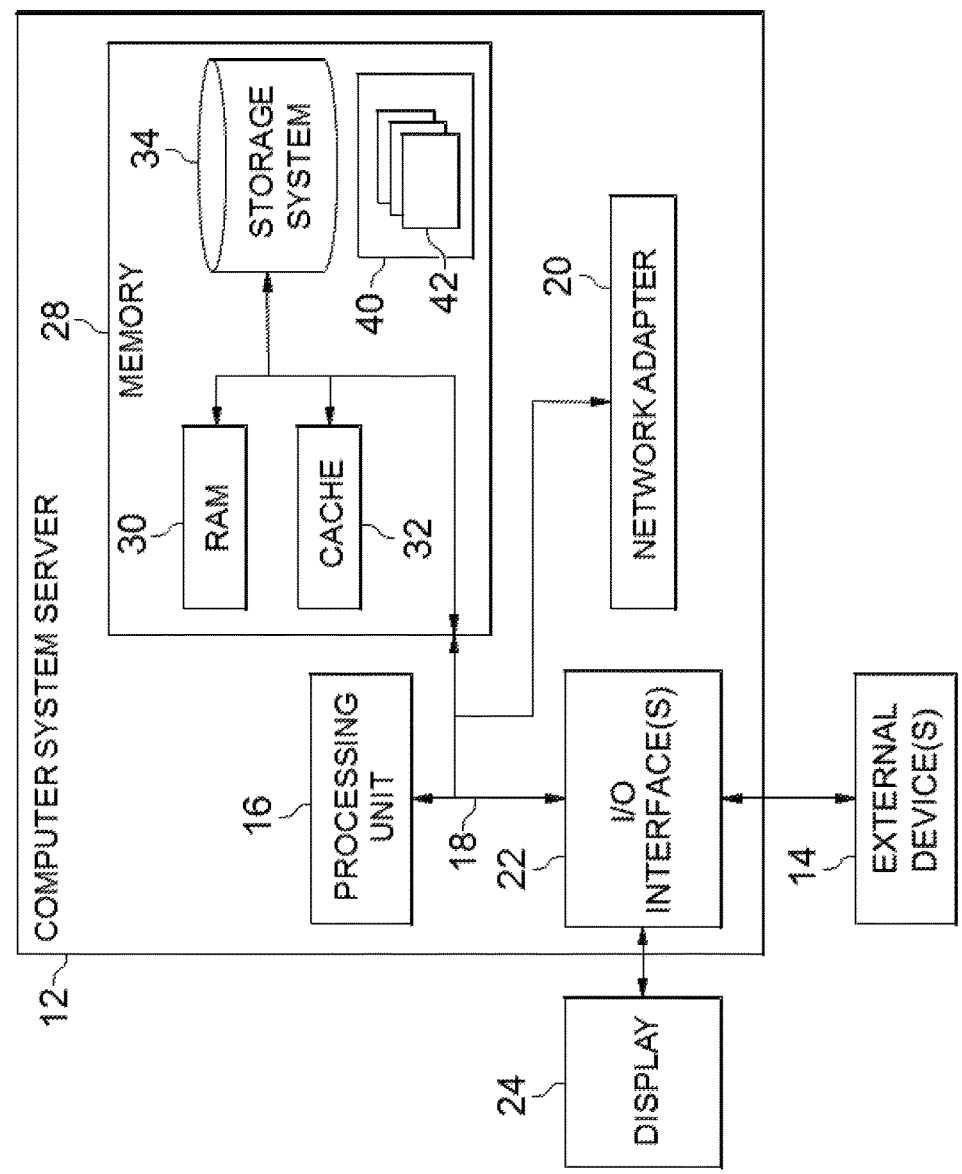
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
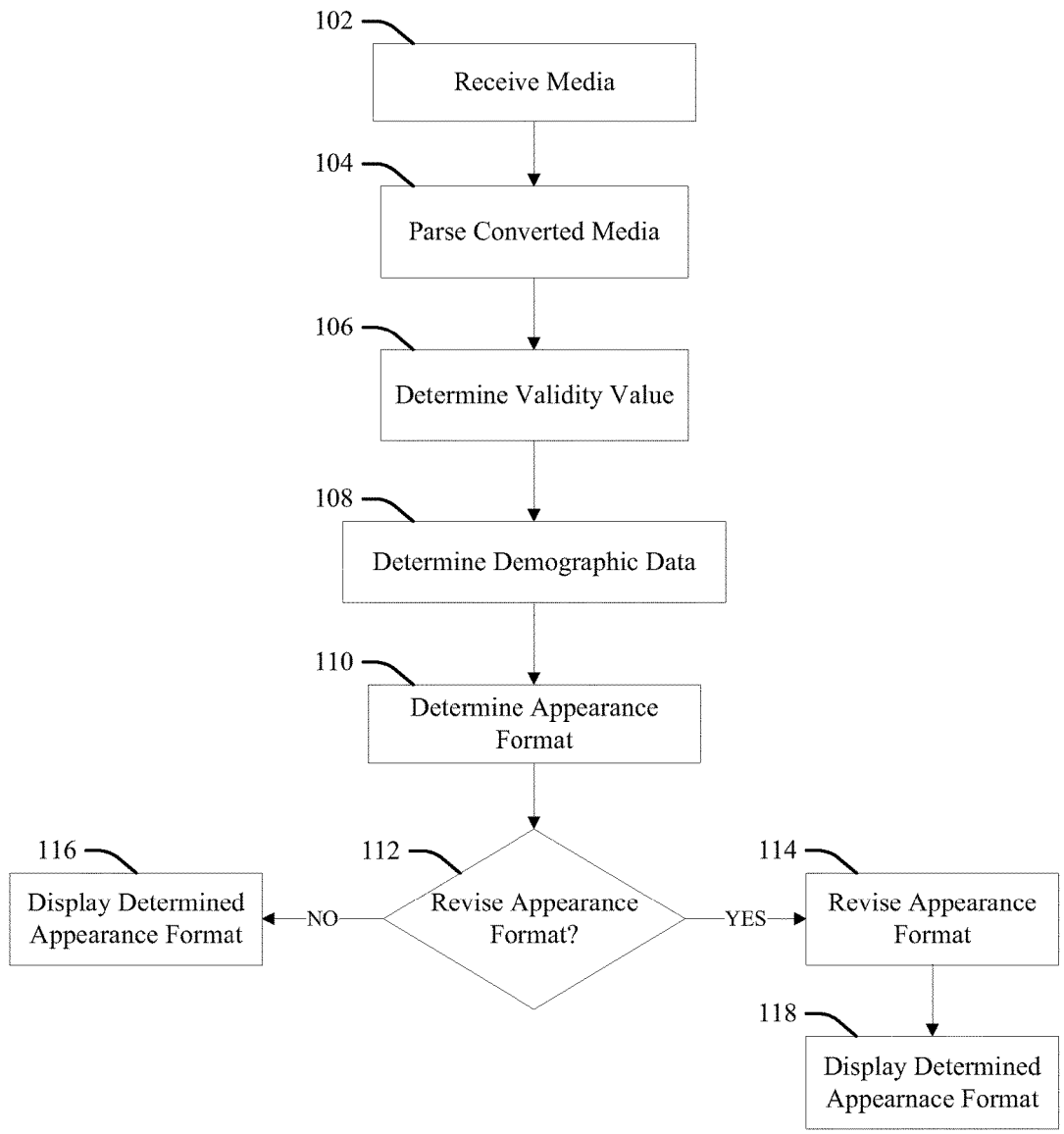
FIG. 4 is a flow chart illustration of an embodiment of the present invention.

FIG. 4 illustrates a process or system according to the present invention for cognitively displaying media. At 102, a processor that is configured according to an aspect of the present invention (the "configured processor") receives a media item to be displayed. The media may be in any format so long as the media includes searchable information (illustrative but not limiting or exhaustive examples include a news article, an image, a video, an advertisement, a blog, a scientific publication, or a stock quote).

At 104, the configured processor parses the media item to determine the age of the media item as a function of the publication date of the media item. The configured processor may further parse the media item to determine the number of times the media item has been viewed and/or downloaded At 106, the configured processor determines a validity value of the media item. In one instance, the configured processor determines the validity value of the media item as a function of the content of the media item and the determined age of the media item.

At 108, the configured processor determines demographic data of a viewer of the media item as a function of viewer inputs. The demographic data may include personal information about the viewer (illustrative but not limiting or exhaustive examples include the viewer's age and desired accessibility features like different font size, background contrast colors or desire to have validity read aloud).

At 110, the configured processor determines an appearance format for the media item as a function of the determined validity value of the media item and/or the determined demographic data. The appearance format is selected to convey at least the determined validity value of the content of the media item to a viewer in a manner that is appropriate to the determined age of the media item.

At 112, the configured processor determines if appearance format of the displayed media item should be revised as a function of the publication date or age of the viewer.

At 114, if the configured processor determines revisions to the determined appearance format are needed, then the configured processor revises the determined appearance format as a function of the determined revision.

At 116, if the configured processor determines no revisions are needed to the determined appearance format then the configured processor displays the determined appearance format of the media item.

At 118, the configured processor displays the revised determined appearance format of the corpus if media.

Wherein the configured processor receives a media item at 102, in one instance, the configured processor may receive the media as a result of a user search. For example, if a user performs an internet search for "Big Corp." stock value, the configured processor may receive the corresponding search results as the media item to be displayed.

Wherein the configured processor parses the media item to determine the age of the media at 104, in one instance, the configured processor may search the media item for a publication date in order to determine the age of the converted media item. In another instance, the configured processor may determine the number of views of the media item by searching the media item for the number of times the media item has been viewed.

Wherein the configured processor determines a validity value of the media item at 106, in one instance, the configured processor may determine the validity of a first media item relative to a second media item as a function of the overall number of views of the first media item to the overall number of views of the second media item. For example, if the first media item has 1,000 views and the second media item has 10,000,000 views, the configured processor will determine the second media item as more valid than the first media item.

In another instance, the configured processor may determine the validity of a first media item relative to a second media item as a function of a view rate of the first and second media item, wherein the view rate is determined as the number of views of a media item divided by a given time period (illustrative but not limiting or exhaustive examples include a time since the publication of the media item, a seven day period, or a twenty-four hour time period). For example, if the given time period for a view rate is the time since publication, and a first media item has 5,000,000 views since its publication 5 years ago, then the configured processor may determine a view rate as 1,000,000 views per year. If a second media item has 2,000,000 views since publication one year ago, then the configured processor may determine a view rate of the second media item as 2,000,000 views per year. In this example, the configured processor may determine the second media item as more valid than the first media item as the second media item has a greater view rate per year than the second media item.

In yet another instance, the configured processor may determine the validity of a first media item relative to a second media item as a function of the overall number of times the media item is cited by other corpuses of media. For example, if the first media item is cited by 10 other corpuses of media and the second media item is cited by 10,000 other corpuses of media, then the configured processor will determine the second media item as more valid than the first media item since the second media item is cited more often.

In yet another instance, the configured processor may determine the validity of a first media item relative to a second media item as a function of a citation rate of the first and second media item, wherein the citation rate is determined as the number of citations of a media item within other corpuses of media divided by a given time period. For example, if the given time period is the time since the publication, and a first media item has 500 citations since its publication 5 years ago, then the configured processor may determine a citation rate as 100 citations in other corpuses of media per year. If a second media item has 200 citations in other corpuses of media since publication one year ago, then the configured processor may determine a citation rate of the second media item as 200 citations per year. In this example, the configured processor may determine the second media item as more valid than the first media item as the second media item has a greater citation rate per year than the second media item.

In yet another instance, the configured processor may assign a validity score based on a scale (illustrative but not limiting or exhaustive examples include a 0-10 scale, a 0-50 scale, or a 0-100 scale) to the media item as a function of the overall number of views, view rate, the overall number of times the media item is cited in other corpuses of media, or citation rate, with respect to a predetermined threshold (illustrative but not limiting or exhaustive examples include for a corresponding 0-10 scale, 100 views/citations or less corresponds to a validity score of 1, 1,000 to 1,999 views/citations corresponds to a validity score of 5, and 1,000,000 views/citations or more corresponds to a validity score of 10). For example, if a media item has 10 views and 10 views corresponds to a score of 4 on a 0-100 scale, then the configured processor assigns a validity score of 4 to the media item. In another example, of the media item has 1,000 views in one hour and 1,000 views per hour corresponds to a validity score of 97 on a 0-100 scale, then the configured processor assigns a score of 97 to the media item.

Wherein the configured processor determines a validity value of the media item at 108, in one instance, the configured processor may determine the validity value of a first media item with respect to a second media item as a function of the content and publication date of the first and second media item. For example, the configured processor may determine the content of the first media item includes contemporaneous battlefield observations during the U.S. Civil War and may further determine that the first media item was published in 1863. The configured processor may also determine that the content of the second media item also includes similar U.S. Civil War contemporaneous battlefield observations and was published in 1905. As a result, the configured processor will determine the first media item as having a higher validity value as a media item about battlefield observations written at the time of the event is more likely to be valid than a media item with similar observations written decades later.

In yet another instance, the configured processor may determine a validity value score as a function of content, publication date, and a time period threshold. For example, if the validity score is based on a 1-10 scale, wherein 10 is a better validity score than 1, and the time period threshold is for every 10 years a publication date is removed from the content date of the media item, then the validity score drops a point, then a media item about U.S. Civil War contemporaneous battlefield observations that was published in 1945 may receive a 6, as the publication is four decades removed from the content of the media item, whereas a media item about U.S. Civil War contemporaneous battlefield observations that was published in 1873 may receive a 9 as the publication media item is a decade removed from the content of the media item.

In another instance, the configured processor may determine the validity value as true or false as a function of the content of the media item and publication date of the media item with respect to a validity time period threshold that is relative to the content of the media item. For example, if the configured processor determines the content of the media item includes the stock price of Big Corp., the publication date of the media item is the same date as the date that the validity value is being determined, and the validity time period threshold is 24 hours for content relating to stock quotes, then the configured processor will determine that validity value is true. However, if the media item contains a stock quote that is several days old, then the configured will determine the validity value as false.

In another instance, the configured processor may determine the validity value of a media item as true or false as a function of a determination that the content of the media item is no longer true, never was true, or contradicts another part of the media item. For example, if the configured processor on Jan. 2, 2010 determines that the media item includes a 20% off coupon that is valid until Jan. 1, 2010 then the configured processor will determine the validity value as false. In another example, the configured processor on Jan. 2, 2010 determines that the media item includes a 20% off coupon that is valid until Jan. 1, 2020 then the configured processor will determine the validity value as true.

In another example, if the configured processor determines the content of the media item contains a headline reading "Dewey Defeats Truman" then the configured processor will determine the validity value as false. In yet another example, if the configured processor determines the content of the media item contains a headline reading "Trump Defeats Clinton" then the configured processor will determine the validity value as true.

In yet another example, if the configured processor determines the media item contains content stating Jun. 15, 2015 snow in Florida and contains an image taken in Cleveland dated Jan. 5, 2010, then the configured processor will determine the validity value as false as the content and image contradict one another.

Wherein the configured processor determines an appearance format for the media item at 110, in one instance, the configured processor may determine an appearance format of the media item in such a way so that the determined validity of the media item is conveyed to the viewer by altering the appearance of the media item (illustrative but not limiting or exhaustive examples include causing the media item to appear wrinkled as a function of its age or number of views/view rate and changing the color of the media item to reflect discoloration that occurs over time based on the age of the media item).

For example, a news article which is from an old date will get displayed as an old newspaper whereas the latest news will get displayed as a fresh news paper on the electronic media.

In another example, if the determined age of a first media item is 100 years old and the determined age of a second media item is a 1 year old then the configured processor may determine an appearance format of the first media item as wrinkled and/or yellowed to reflect 100 years of aging, whereas the configured processor may determine an appearance format for the second media item as a crisp image to reflect the relative newness of the image.

In another example, if the number of views of a first media item is 1,000,000 and the number of views of a second media item is 100 views, then the configured may determine an appearance format of the first media item as wrinkled as if 1,000,000 people had physically handled the first media item, whereas the configured processor may determine an appearance format of the second media item as a more crisp image as if only a relatively few number of people have physically handled the second media item. In yet another example the configured processor may determine an appearance format of a corpus media to include the determined age of the media item as an overlay on the media item in such a way as to convey the age of the media item to the viewer.

In yet another example, if due to the overall number of views of a media item, the configured processor determines the media item has a validity score of 97 on a scale of 1-100, wherein 100 is more valid than 0, then the configured processor may determine an appearance format of the media item as 97% wrinkled, wherein 100% wrinkled is the most wrinkled the configured processor could display the media item, as if the media item has physical been handled by several people thereby visually conveying the overall number of views of the media item to the viewer.

In another instance, the configured processor may determine an appearance format of the media item as including coloring the media item as a function of validity value (illustrative but not limiting or exhaustive examples include coloring a banner of the media item as a function of validity value or coloring a background of the media item as a function of validity value).

For example, if the configured processor determines a first media item as having a higher validity value than a second media item, then the configured processor may determine an appearance format of the first media item as including a green banner, so as to convey the higher validity value, and may determine an appearance format for the second media item as including a red banner to the second media item, so as to convey the lower validity value. In another example, if the configured processor determines a first media item as having a true validity value and a second media item as having a false validity value, then the configured processor may determine an appearance format of the media item as including coloring the background of the first media item as green, so as to convey the true validity value, and may determine an appearance format of the second media item as including coloring the background of the second media item as red, so as to convey the false validity value.

In another instance, the configured processor may determine an appearance format of that lists corpuses of media as a function of validity or validity value so as to convey the validity or validity value of the corpuses of media. For example, if the configured processor determines a first media item is more valid or has a greater validity value than a second media item, then the configured processor determine an appearance format of the first and second corpuses of media that lists the first media item ahead of the second media item so as to convey that the first media item has a higher validity/validity value than the second media item. In another example, if the configured processor determines a first media item has a true validity value and a second media item has a false validity value then the configured processor may determine an appearance format of the first and second corpuses of media that lists the first media item and does not list the second media item so as to convey that the first media item has a true validity value and the second media item has a false validity value.

In yet another instance, the configured processor may determine an appearance format of the media item as a function of the determined demographic data.

For example, if the demographic data includes the age of the viewer, then the configured processor may determine an appearance format of the media item as a format that is more likely to be more recognizable to the viewer based on their age. Hence, the configured processor may display the media item as a newspaper article for an older viewer and display the same media item as a webpage for a younger viewer.

In another example, if the demographic data includes a viewer desired change in font or background color, then the configured processor may determine an appearance format of the media item as including an alteration the appearance of the media item as a function of the desired change in background color. In yet another example, if the demographic data includes a viewer desire to have the determined validity or determined validity value of the media item read aloud, then the configured processor may play an audio file corresponding to the determined validity or determined validity value of the media item.

Wherein the configured processor determines if the displayed media item should be revised as a function of the publication date or age of the viewer at 112, in one example, if the configured processor determines an appearance format of the media item includes as a new piece of media yet the age of the viewer is over an age threshold, then the configured processor may determine the displayed media item should be revised so that the media item appears in an older format. In another example, if the determined appearance format of media item includes a 100 year old media item since it has only been viewed by a small number of people and as a result is appears as if it had not been handled by a large number of people and hence new, the configured processor may determine that, based on the age of the media item, the displayed media item should be revised so as to convey the age of the media item.

The cognitive oriented display provides a system which co-exists with smart device monitoring tools, identifies the insights of the data or media, communicates with users and smarter devices, detects status based on age and validation factors, collects the data from different areas (like search engines, blogs, websites, user feedbacks, etc.) and analyze that data, consider history and age, date parameters and act upon with enablement of cognition.

The display may be (but not limited to) monitors, personal computers, display boards, mobile phones, speaker, etc. The system will act as help in case of a search using machine learning and cognitive engine. For example, if one wants to search for Big Corp. revenues, the system will give results based on the age showing older revenue news in a way that the user can identify that this is older news even before opening the website and checking manually if the news is recent or an older one. This will be very useful in cases of advertisements where discounts are changed every day, rather every hour in case of flash sales.

Integration with domestic robotics may be used for speech or voice based inputs and output by just looking into the search results. For example, if desired, the robot should be able to interpret the age and communicate accordingly "First search result says that Big Corp. revenues are 25% down, but this news is too old, it is for second quarter 2017. Next news looks recent which says its 10% down for last quarter 2017 . . . ". This will be done by just looking into the search results.

Data contents needs to be represented in a way that the user can understand it just looking at the data presentation. This system is aimed to create a display system which will cognitively analyze the data (which can be media, advertisements, images, videos, blogs, news, etc.) and display it using the factors like age and validity.

This invention is also extended to present the data to physically impaired users and create story based on the data analysis. This has been detailed with an example in the above sections.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor:
   determining an age of a media item as a function of a publication time of the media item;
   determining a subject matter of content within the media item;
   determining a validity period for the subject matter;
   selecting a first validity value rather than a second validity value for the subject matter in response to determining that the age of the media item falls within the validity period; and
   displaying the media item to a viewer in a first appearance format that is selected to convey the first validity value of the media item to the viewer in a manner that is appropriate to the determined age of the media item; and
   wherein the first appearance format is different from a second appearance format that is selected to convey the second validity value of the media item to the viewer in a manner that is appropriate to the determined age of the media item.

2. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the determining of the age of the media item, the determining of the subject matter of the content within the media item, the determining of the validity period for the subject matter, the selecting of the first validity value rather than the second validity value in response to the determining that the age of the media item falls within the validity period, and the displaying of the media item to the viewer in the first appearance format.

3. The method of claim 1, wherein the computer-readable program code is provided as a service in a cloud environment.

4. The method of claim 1, further comprising:
determining an age of the viewer; and
selecting the first appearance format to render the media item content in a publication style that is appropriate to the determined age of the viewer.

5. The method of claim 4, further comprising:
determining a number of times that the media item has been viewed by viewers; and
selecting the first appearance format to convey a paper publication of the media item content that is wrinkled to an extent that is proportional to the determined number of times that the media item has been viewed by the viewers.

6. The method of claim 1, wherein the configured processor selects the first appearance format to display a number of wrinkles in proportion to the determined age of the media item.

7. The method of claim 6, further comprising:
determining a truthfulness value for the content of the media item as a function of a number of true facts relative to a number of false facts within the content of the media item;
determining the first validity value of the media item as a function of the determined truthfulness value; and
displaying the media item to a viewer in an appearance format that is selected to convey the first validity value of the content of the media item to the viewer.

8. A system comprising:
a processor;
a computer readable memory in circuit communication with the processor; and
a computer readable storage medium in circuit communication with the processor; wherein the processor executes program instructions stored on the computer-readable storage medium via the computer readable memory and thereby:
determines an age of a media item as a function of a publication time of the media item;
determine a subject matter of content within the media item;
determines a validity period for the subject matter;
selects a first validity value rather than a second validity value for the subject matter in response to determining that the age of the media item falls within the validity period; and
displays the media item to a viewer in a first appearance format that is selected to convey the first validity value of the media item to the viewer in a manner that is appropriate to the determined age of the media item; and
wherein the first appearance format is different from a second appearance format that is selected to convey the second validity value of the media item to the viewer in a manner that is appropriate to the determined age of the media item.

9. The system of claim 8, wherein the processor executes the program instructions stored on the computer-readable storage medium via the computer readable memory and thereby:
determines an age of the viewer; and
selects the first appearance format to render the media item content in a publication style that is appropriate to the determined age of the viewer.

10. The system of claim 9, wherein the processor executes the program instructions stored on the computer-readable storage medium via the computer readable memory and thereby:
determines a number of times that the media item has been viewed by viewers; and
selects the first appearance format to convey a paper publication of the media item content that is wrinkled to an extent that is proportional to the determined number of times that the media item has been viewed by the viewers.

11. The system of claim 8, wherein the processor executes the program instructions stored on the computer-readable storage medium via the computer readable memory and thereby:
selects the appearance first format to display a number of wrinkles in proportion to the determined age of the media item.

12. The system of claim 11, wherein the processor executes the program instructions stored on the computer-readable storage medium via the computer readable memory and thereby:
determines a truthfulness value for the content of the media item as a function of a number of true facts relative to a number of false facts of true and false facts within the content of the media item;
determines the first validity value of the media item as a function of the determined truthfulness value; and
displays the media item to a viewer in an appearance format that is selected to convey the first validity value of the content of the media item to the viewer.

13. A computer program, comprising:
a computer readable storage medium having computer readable program code embodied therewith, wherein the computer readable storage medium is not a transitory signal per se, the computer readable program code comprising instructions for execution by a processor that cause the processor to:
determine an age of a media item as a function of a publication time of the media item;
determine a subject matter of content within the media item;
determine a validity period for the subject matter;
select a first validity value rather than a second validity value for the subject matter in response to determining that the age of the media item falls within the validity period; and
display the media item to a viewer in a first appearance format that is selected to convey the first validity value of the media item to the viewer in a manner that is appropriate to the determined age of the media item; and
wherein the first appearance format is different from a second appearance format that is selected to convey the second validity value of the media item to the viewer in a manner that is appropriate to the determined age of the media item.

14. The computer program product of claim 13, wherein the computer readable program code instructions for execution by the processor further cause the processor to:
determine an age of the viewer; and
select the first appearance format to render the media item content in a publication style that is appropriate to the determined age of the viewer.

15. The computer program product of claim 14, wherein the computer readable program code instructions for execution by the processor further cause the processor to:

determine a number of times that the media item has been viewed by viewers; and select the first appearance format to convey a paper publication of the media item content that is wrinkled to an extent that is proportional to the determined number of times that the media item has been viewed by the viewers.

16. The computer program product of claim 13, wherein the computer readable program code instructions for execution by the processor further cause the processor to:

select the first appearance format to display a number of wrinkles in proportion to the determined age of the media item.

17. The computer program product of claim 16, wherein the computer readable program code instructions for execution by the processor further cause the processor to:

determine a truthfulness value for the content of the media item as a function of a number of true facts relative to a number of false facts within the content of the media item;

determine the first validity value of the media item as a function of the determined truthfulness value; and display the media item to a viewer in an appearance format that is selected to convey the first validity value of the content of the media item to the viewer.

18. The computer program product of claim 17, wherein the computer readable program code instructions for execution by the processor further cause the processor to:

select the first appearance format as a webpage display as a function of the determined age of the media item and the determined age of the viewer.

19. The computer program product of claim 17, wherein the computer readable program code instructions for execution by the processor further cause the processor to:

select the first appearance format as a newspaper display as a function of the determined age of the media item and the determined age of the viewer.

20. The computer program product of claim 19, wherein the computer readable program code instructions are provided as a service in a cloud environment.

* * * * *